US007049760B2

(12) United States Patent
Dowe

(10) Patent No.: US 7,049,760 B2
(45) Date of Patent: May 23, 2006

(54) CAMERA FLASH CIRCUIT USING A PIEZOELECTRIC TRANSFORMER TO TRIGGER FIRING OF THE CAMERA FLASH TUBE

(75) Inventor: David R. Dowe, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/897,599

(22) Filed: Jul. 23, 2004

(65) Prior Publication Data

US 2006/0017396 A1 Jan. 26, 2006

(51) Int. Cl.
*G03B 15/03* (2006.01)
*H05B 41/32* (2006.01)

(52) U.S. Cl. .......................... 315/241 P; 315/209 PZ

(58) Field of Classification Search ............ 315/241 P, 315/200 A, 209 PZ, 241 R; 396/206; 310/319
See application file for complete search history.

(56) References Cited

U.S. PATENT DOCUMENTS

| | | | | |
|---|---|---|---|---|
| 2,830,274 | A | 4/1958 | Rosen et al. | 333/32 |
| 2,974,296 | A | 3/1961 | Rosen | 333/72 |
| 2,975,354 | A | 3/1961 | Rosen | 321/8 |
| 3,782,258 | A * | 1/1974 | Boekkooi et al. | 396/182 |
| 4,025,817 | A * | 5/1977 | Wollschleger | 315/241 P |
| 4,054,815 | A * | 10/1977 | Hoene et al. | 315/241 R |
| 4,054,817 | A | 10/1977 | Gurwicz et al. | 318/82 |
| 4,082,985 | A | 4/1978 | Bolhuis | 315/241 P |
| 5,065,067 | A | 11/1991 | Todd et al. | 310/339 |
| 5,751,092 | A | 5/1998 | Abe | 310/359 |
| 5,962,954 | A | 10/1999 | Leers et al. | 310/359 |
| 6,091,906 | A * | 7/2000 | Hata | 396/206 |
| 6,229,251 | B1 | 5/2001 | Asada et al. | 310/366 |
| 6,526,233 | B1 * | 2/2003 | Crone | 396/206 |
| 6,564,015 | B1 | 5/2003 | Ishikawa et al. | 396/206 |
| 6,614,144 | B1 * | 9/2003 | Vazquez Carazo | 310/359 |
| 6,633,728 | B1 * | 10/2003 | Motomura | 396/6 |
| 6,941,070 | B1 * | 9/2005 | Kubota | 396/206 |
| 2002/0028072 | A1 * | 3/2002 | Kashiyama | 396/106 |
| 2002/0061193 | A1 | 5/2002 | Ishikawa et al. | 396/206 |

FOREIGN PATENT DOCUMENTS

| | | |
|---|---|---|
| JP | 1-154291 | 6/1989 |
| WO | WO 03/030215 | 4/2003 |

OTHER PUBLICATIONS

S. Hallaert et al., "Numerical and Analytical Modeling of the Piezoelectric Transformer and Experimental Verification".

* cited by examiner

*Primary Examiner*—Thuy V. Tran
*Assistant Examiner*—Angela M Lie
(74) *Attorney, Agent, or Firm*—Roland R. Schindler, II

(57) ABSTRACT

A camera flash circuit employing a piezoelectric transformer in the flash trigger circuit, the piezoelectric transformer having input terminals coupled to the main flash voltage storage capacitor and an output terminal coupled to the flash trigger terminal on the flash tube. When the camera flash trigger switch is closed, the input terminals of the piezoelectric transformer are driven directly from the charge voltage stored on the flash storage capacitor to generate the necessary high voltage pulse at the flash tube trigger terminal to initiate firing of the flash tube.

3 Claims, 2 Drawing Sheets

CAMERA FLASH CIRCUIT USING A PIEZOELECTRIC TRANSFORMER TO TRIGGER FIRING OF THE CAMERA FLASH TUBE

FIELD OF THE INVENTION

This invention relates to camera flash circuits and more particularly to such circuits using a piezoelectric transformer device to ionize gas molecules in the flash tube to thereby initiate firing of the flash tube.

BACKGROUND OF THE INVENTION

Flash capable cameras, both film-based and digital electronic, typically employ a flash tube enclosing an ionizable gas, such as xenon, to create the bright flash of light needed to capture images in a low light level scene. Basic elements of a flash circuit used to fire the tube typically include a battery, a voltage converter flash charging circuit, a flash voltage storage capacitor and a trigger circuit connected to a trigger terminal associated with the flash tube. The flash charging circuit converts the low battery voltage of about 1.5 v or 3.0 v to a high flash charge voltage on the order of 330 v. This voltage is applied to the flash storage capacitor which is coupled to the input electrodes of the flash tube. The gas in the tube, in its normal state, presents an extremely high impedance which prevents the flash capacitor from discharging through the tube to create any bright flash light emission. When it is desired to take a picture, the trigger circuit responds to opening of the shutter to generate and apply to the trigger terminal an intermediate high voltage, on the order of 4,500 v that is sufficient to ionize the gas molecules in the tube. This reduces the impedance of the tube to a very low level allowing the flash capacitor to discharge the stored flash voltage through the low impedance of the flash tube thereby creating the desired intense flash of light.

A commonly used form of trigger circuit employs a trigger capacitor connected through a high impedance to the flash charging circuit and the flash storage capacitor to be charged to the same voltage as the flash storage capacitor. The trigger capacitor is also coupled in a circuit leading through the primary winding of a trigger voltage step-up transformer and a normally open trigger switch, the switch being actuated by the camera shutter mechanism to be closed when the shutter is opened. The secondary winding of the transformer is coupled to the trigger terminal of the flash tube. When the user initiates a picture-taking sequence by depressing the shutter release button, the trigger switch is closed causing the trigger capacitor to discharge through the primary of the trigger transformer which, in turn, generates the high voltage pulse on the trigger terminal needed to fire the flash tube as described above.

Other forms of flash trigger circuits have been described that use a piezoelectric device to generate the high voltage pulse for ionizing the gas in the flash tube. In an early patent U.S. Pat. No. 4,025,817, issued May 24, 1977 entitled "Trigger Device for an Electronic Flash Unit" and assigned to the assignee of the present invention, a mechanically actuated piezoelectric device is substituted in the trigger circuit for the trigger capacitor and step-up trigger transformer. The arrangement described includes a hammer and anvil that mechanically deforms the piezoelectric crystal to generate the output pulse applied to the flash tube trigger terminal. While effective, the arrangement requires added relatively complex and costly mechanical structure to actuate the piezoelectric crystal. Additionally, added circuit components are required to assure reliability of triggering of the flash tube.

In issued patent U.S. Pat. No. 6,564,015 B2, granted May 13, 2003, a flash circuit is described that utilizes an electronically driven piezoelectric transformer device both to charge the flash storage capacitor and to trigger the flash tube. Unlike the mechanically actuated device, a piezoelectric transformer operates in response to a voltage pulse voltage or an oscillatory voltage applied to input terminals to generate a stepped up output voltage pulse or oscillatory voltage. In prior art FIG. 7 of this patent, a pair piezoelectric transformers are each driven by an oscillatory circuit and a driver circuit to generate separately the desired output voltages. In the remaining circuits disclosed, a single piezoelectric transformer device is driven by an oscillatory circuit and a driving circuit. The voltage outputs are alternately switched to charge the flash charge capacitor and trigger firing of the flash tube, thereby accomplishing both functions with a single piezoelectric device. However, as shown by the several embodiments in the patent, limitations of the transformer device force the use of added circuit components and/or modification of the transformer output electrode connections with the transformer crystal to achieve the necessary dual functionality thereby adding cost and complexity.

SUMMARY OF THE INVENTION

In accordance with the invention, therefore, there is provided a camera flash circuit that makes effective use of a piezoelectric transformer to trigger firing of a flash tube but without the added circuit costs and disadvantages of the above described prior art arrangements. To this end there is provided a flash circuit for a camera having a lens shutter wherein the flash circuit comprises a flash capacitor and a flash capacitor charging circuit for generating a flash discharge voltage on the flash capacitor. The flash circuit also includes a flash tube having a pair of input electrodes in an envelope enclosing gas molecules, a trigger terminal adjacent the flash tube envelope, and a flash trigger switch adapted to close at a desired time of flash illumination. The flash circuit further includes a piezoelectric transformer having an input coupled with the flash capacitor and to the flash trigger switch and an output coupled to the flash tube trigger terminal, the transformer being responsive to charge voltage on the flash capacitor upon closure of the flash trigger switch to generate a high voltage at the flash tube trigger terminal sufficient to ionize gas in the flash tube thereby causing a flash illumination from discharge of the flash capacitor voltage through the input electrodes of the flash tube.

An advantage of the present invention is that the piezoelectric transformer may be employed as a substitute for the flash trigger capacitor and step-up trigger transformer in present day commonly used flash circuits without the need added circuit components and without the need for special adaption of the output terminals of the transformer, thereby reducing overall cost of the circuit and simplifying changeover to the new arrangement.

A further advantage of the invention is that coupling the input of the piezoelectric transformer with the flash capacitor eliminates the need for a separate driving circuit as is required in the aforementioned disclosure of patent U.S. Pat. No. 6,564,015 B2.

DETAILED DESCRIPTION OF THE INVENTION

Figure 1:
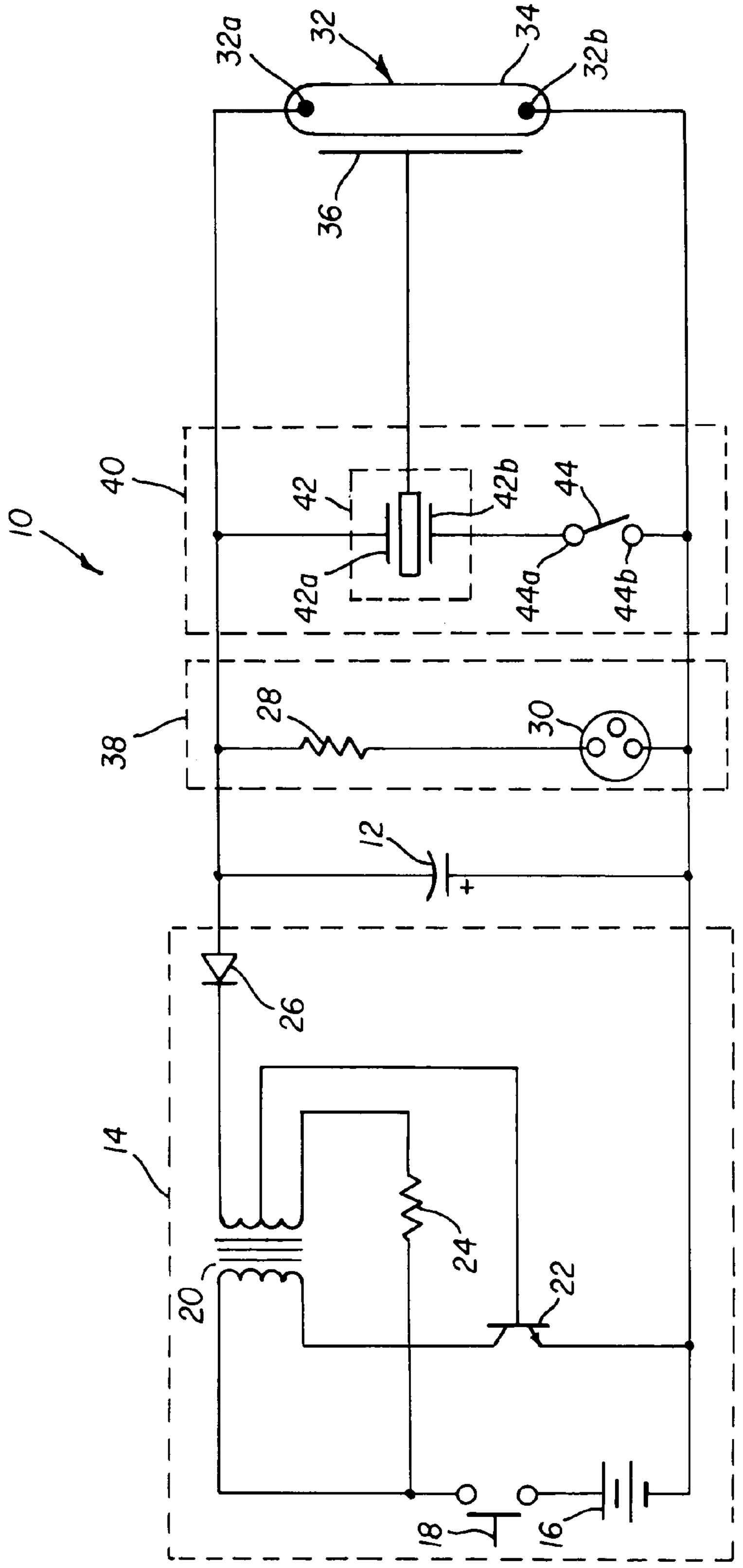
FIG. 1 is a schematic circuit diagram of a flash camera circuit in accordance with the invention.

Turning now to FIG. 1, a camera flash circuit 10 shown therein includes a flash charge storage capacitor 12 and a flash capacitor charging circuit 14 comprised of a battery 16, and a power switch 18, a step-up power transformer 20, an NPN oscillation power transistor 22, and resistor 24. A diode rectifier 26 couples negative-going voltage pulses to storage capacitor 12, to charge the capacitor in known manner, to a negative flash charge voltage of about 330 v. It should be noted that the charging circuit shown is basic in nature and that many well known variations of this basic circuit may be employed. A flash ready indicator circuit 38 is usually provided in the flash circuit and includes resistor 28 and a neon lamp 30. The flash circuit also includes a flash tube 32 having a pair of input electrodes 32*a*, 32*b* in an envelope 34 enclosing molecules of an inert gas such as xenon. A flash trigger terminal 36 is mounted adjacent the tube envelope in known manner.

In accordance with the invention, a flash trigger circuit 40 is provided that comprises a piezoelectric transformer 42 having input terminals 42*a*, 42*b* coupled with the flash charge storage capacitor 12.

Piezoelectric transformer 42 can take one of many possible forms. For example, in one embodiment, piezoelectric transformer 42 can comprise a so called "Rosen-type" piezoelectric transformer fabricated following the teachings of U.S. Pat. No. 2,830,274 entitled "Electromechanical transducer", U.S. Pat. No. 2,974,296, entitled "Electromechanical transducer" and U.S. Pat. No. 2,975,354 entitled "Electrical Conversion Apparatus" all filed in the name of Rosen on Jun. 29, 1954. Other variations of such transformers are well known in the art.

Typically such "Rosen type" transformers provide a generally unitary body of a piezoelectric material formed, for example, using polycrystalline aggregates of ferroelectric ceramics, including but not limited to barium titanate with small percentages of added in such as cobalt compositions, nickel compositions, calcium titanate and lead titanate or compositions of principally led zirconate or principally lead metanionate. The unitary body has an input portion and an output portion with the input portion having input electrodes and the output portion having output electrodes. In the '354 patent, the a common electrode is used as a return for both the input and output electrodes. The application of electrical potential to the input electrodes creates mechanical thickness vibrations along one axis of the body in the input portion. These vibrations are cause axial vibrations along a different axis between the electrodes of the output portion. The piezoelectric material between electrodes of output portion converts the vibrations induced in the input portion into electrical potential at the output electrodes. The output electrodes typically span a dimension along the output portion that is greater that the span of the input electrodes on the input portion. Because of this, the amplitude of the vibration experienced by the piezoelectric material situated between the output electrodes is greater than the amplitude of the vibration created between the input electrodes and therefore the electrical potential created between the output electrodes can be many times greater than the potential that is introduced between the input electrodes.

In another embodiment, piezoelectric transformer 42 can comprise a multiple layer transformer. In such a multiple layer piezoelectric transformer, individual "Rosen-type" transformers are arranged in a stacked arrangement. There are various ways in which this can be done. These arrangements provide a variety of advantages in that greater power transfer is available. Examples of such multiple layer piezoelectric transformers include but are not limited to those described as being formed in accordance with WO 03/030215 entitled MULTILAYER PIEZOELECTRIC TRANSFORMER filed by Vasquez on Jan. 21, 2003. In another embodiment, an MPT3608B90 transformer sold by Xi'an Kong Hong Information Technology Co., Ltd. Xian. China can be used. The MPT3608B90 is sold in a form that is adapted to convert input voltages of 5 volts to an output voltage level of 4250 volts. However, in this embodiment, input will be modified so that it is adapted to receive an input of 330 volts. Such a modification can be accomplished by making an appropriate parametric scaling change to the input electrodes of the MPT3608B90.

Figure 2:
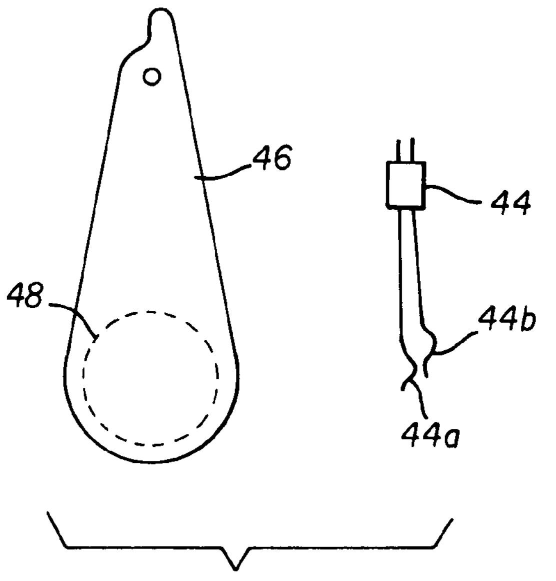
FIGS. 2 and 3 are schematic illustrations of a camera shutter mechanism useful with the flash circuit of FIG. 1
Figure 3:
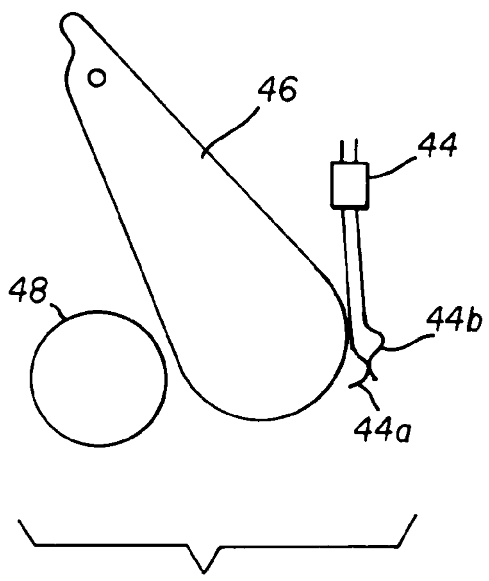

In the illustrated embodiment, one of such transformer input terminals 42*b* is coupled with capacitor 12 through contacts 44*a*, 44*b* of a flash trigger switch 44. In FIG. 2, a camera shutter 46 is shown in its "at rest" position blocking camera lens 48. When a camera user depresses the camera's shutter release button, a known mechanical linkage (not shown) swings shutter 46 counterclockwise in the drawing to unblock the optical path to the lens and to close contacts 44*a*, 44*b* of trigger switch 44. This action directly connects both input terminals 42*a*, 42*b* of piezoelectric transformer 42 to flash storage capacitor 12 instantaneously applying the 330 v charge voltage on the storage capacitor to the transformer input terminals. This results in electrically deforming the piezoelectric crystal of the transformer to produce a high voltage pulse to the trigger terminal 36 of flash tube 32 resulting in ionization of some of the molecules of gas in the tube envelope. This, in turn, causes the interelectrode resistance of the gas to drop dramatically resulting in instantaneous discharge of the capacitor 12 charge voltage through the flash tube to generate the momentary, e.g. one millisecond, intense flash of illumination from the flash tube. It will be appreciated from the foregoing description that, unlike the prior art described above, the present invention, since the piezoelectric circuit is driven directly from the flash voltage storage capacitor, the novel circuit obviates the need for separate oscillatory and/or driver circuits for actuating the transformer.

It will also be appreciated from the foregoing, that the present invention can be practiced in cameras of the type that do not use a shutter switch 46 that is triggered by a mechanical shutter, such as electronic cameras, video cameras, digital cameras and the like, shutter switch 46 can comprise a coupler that is operated by an electronic signal from a camera micro-processor (not shown) or similar control circuit for such a camera. Examples of such a coupler include a voltage controlled or current controlled switch such as a transistor, an opto-coupler, an electrically controlled mechanical switch, a relay or the like.

The invention has been described in detail with particular reference to certain preferred embodiments thereof, but it will be understood that variations and modifications can be effected within the spirit and scope of the invention.

PARTS LIST

10. camera flash circuit
12. flash charge storage capacitor
14. flash capacitor charging circuit
16. battery
18. power switch
20. power transformer
22. power transistor
24. resistor
26. diode rectifier
28. resistor
30. neon lamp
32. flash tube
32*a, b* flash tube electrodes
34. tube envelope
36. flash trigger terminal
38. flash ready indicator circuit
40. flash trigger circuit
42. piezoelectric transformer
42*a, b* input terminals
44. flash trigger switch
44*a, b* switch contacts
46. camera shutter
48. camera lens

The invention claimed is:

1. An electronic flash circuit for a camera comprising:

a single flash capacitor;

a flash capacitor charging circuit for generating a flash discharge voltage on the single flash capacitor;

a flash tube having a pair of input electrodes in an envelope enclosing gas molecules;

a flash tube trigger terminal adjacent to the flash tube envelope;

a flash trigger switch having a pair of switch contacts and adapted to close at a desired time of flash illumination, one of the switch contacts being connected directly both to the single flash capacitor and one of the input electrodes in the flash tube envelope; and a piezoelectric transformer having one input connected directly to the single flash capacitor and another of the input electrodes in the flash tube envelope, having another input connected directly to another of the switch contacts of the flash trigger switch, and having an output coupled to the flash tube trigger terminal, the piezoelectric transformer being responsive to charge voltage on the single flash capacitor upon closure of the flash trigger switch to generate a high voltage at the flash tube trigger terminal sufficient to ionize gas in the flash tube envelope thereby causing a flash illumination from discharge of the single flash capacitor voltage through the input electrodes in the flash tube envelope.

2. The circuit of claim 1, wherein said piezoelectric transformer comprises a single layer of piezoelectric material.

3. The circuit of claim 1, wherein said piezoelectric transformer comprises a more than one layer of piezoelectric material.

* * * * *